(12) United States Patent
Hagiwara et al.

(10) Patent No.: US 7,032,568 B2
(45) Date of Patent: Apr. 25, 2006

(54) FUEL FEED DEVICE OF GAS ENGINE

(75) Inventors: Ryouichi Hagiwara, Osaka (JP); Tohru Nakazono, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/501,871

(22) PCT Filed: Jan. 24, 2003

(86) PCT No.: PCT/JP03/00633

§ 371 (c)(1),
(2), (4) Date: Jul. 20, 2004

(87) PCT Pub. No.: WO03/064842

PCT Pub. Date: Aug. 7, 2003

(65) Prior Publication Data

US 2005/0000490 A1    Jan. 6, 2005

(30) Foreign Application Priority Data

Jan. 28, 2002    (JP) .............................. 2002-018212

(51) Int. Cl.
*F02M 21/04*    (2006.01)
(52) U.S. Cl. ...................................... 123/352; 123/527
(58) Field of Classification Search ........ 123/352–354, 123/357, 446, 527
See application file for complete search history.

(56) References Cited

U.S. PATENT DOCUMENTS

| | | | | | |
|---|---|---|---|---|---|
| 3,125,085 | A | * | 3/1964 | Kauffmann | 123/527 |
| 4,576,137 | A | * | 3/1986 | Tanaka | 123/357 |
| 5,012,781 | A | * | 5/1991 | Yokoyama et al. | 123/353 |
| 5,375,576 | A | * | 12/1994 | Ausman et al. | 123/446 |
| 5,673,673 | A | * | 10/1997 | Beck | 123/527 |
| 5,735,248 | A | * | 4/1998 | Matsuura et al. | 123/527 |

FOREIGN PATENT DOCUMENTS

| | | |
|---|---|---|
| JP | 3-85359 A | 4/1991 |
| JP | 9-250401 A | 9/1997 |
| JP | 2001-3774 A | 1/2001 |
| JP | 2001-214811 | 8/2001 |

OTHER PUBLICATIONS

Nissan Diesel Motor Co., Ltd., Microfilm of the specification and drawings annexed to the request of Japanese Utility Model Application No. 144251/1982 (Laid-open No. 47338/84); Mar. 29, 1984; Full text.

* cited by examiner

*Primary Examiner*—Tony M. Argenbright
(74) *Attorney, Agent, or Firm*—Crowell & Moring LLP

(57) ABSTRACT

A fuel feed device of a gas engine of non-supercheged type for feeding air and fuel to an intake port without mixing by amixer, wherein fuel gas is fed into the intake port by utilizing a negative pressure generated in the intake port in an intake stroke.

2 Claims, 5 Drawing Sheets

FUEL FEED DEVICE OF GAS ENGINE

TECHNICAL FIELD

The present invention relates to a fuel feed device of a gas engine which is a non-supercharged type engine and feeds air and fuel to a intake port, without mixing with a mixer.

BACKGROUND ART

Conventionally, there is a port injection type gas engine which injects high-pressure fuel gas to a intake port. However, a gas-compressor is required for injecting the fuel gas with high pressure, and a power for operating the gas-compressor causes decline or decrease in efficiency of the whole gas engine.

DISCLOSURE OF INVENTION

[Problems to be Solved by the Invention]

An object of the present invention is to provide a fuel feed device of a gas engine that can feed fuel gas into a intake port, without using a gas-compressor, in the non-supercharged type gas engine.

[Means for Solving the Problem]

In order to solve the above-mentioned technical problem, the present invention is configured as follows.

In accordance with the first aspect of the present invention, a gas engine is a non-supercharged type engine and feeds air and fuel to an intake port without mixing with a mixer:

wherein the fuel gas is fed into the intake port by using negative pressure generated in the intake port during an intake stroke.

In accordance with the second aspect of the present invention, in set forth the first aspect, a gas engine includes:

a detection means for detecting engine rotational frequency, a judgment means for judging whether the engine rotational frequency detected by said detection means is maintained within a fixed range which is predetermined, an adjustment means for adjusting a feed period of said fuel gas per 1 cycle so that the engine rotational frequency converges within the fixed range.

In accordance with the third aspect of the present invention, in set forth the first or second aspect, a gas engine includes;

a regulator and a valve which are prepared in a fuel gas feed passage sequentially from the upstream, a switching means for making a pressure balance line of said regulator selectively communicate with an inside of the intake port or atmospheric air, said pressure balance line at the time of starting communicates with the inside of the intake port by said switching means.

[More Effective Advantages than Prior Art]

According to the first aspect of the present, since the fuel gas is fed into the intake port 11 by using negative pressure generated in the intake port during an intake stroke, a gas-compressor which is provided to the conventional port injection type of gas engine, is not required, therefore the power for driving the gas compressor is not also needed. Consequently, the whole efficiency of the system can be improved or raised.

Moreover, since the first aspect of the present invention is the method which feeds directly the fuel gas to the intake port 11, it does not need to use a venturi throttle, so that maximum output of the engine can be raised or improved. On the contrary, in the gas engine having a venturi mixer such as a conventional engine, loss of the pressure is caused by the venturi throttle and improvement in the output is restricted.

According to the second aspect of the present invention, it is made to adjust the amount of feed of the fuel gas, namely to adjust the open period of the valve 5, so that variation or change of the engine rotational frequency, which is detected by a sensor 14 for detecting the engine rotational frequency, is controlled within a predetermined fixed range. Therefore, it is avoidable to change or vary the inhalation air content per unit time amount with the difference in throttle opening. In other word, it is avoidable changing the excess air factor.

According to the third aspect of the present invention, since the means (valves 6 and 7) for making the pressure balance line 3 communicate with the inside of the intake port 11, is provided, the feed pressure of the fuel can be adjusted on the basis of the pressure in the intake port 11 at the time of starting. Consequently, the gas engine 100 can be started smoothly and injurious ingredients, such as NOx contained in exhaust gas, are reduced.

BEST MODE FOR CARRYING OUT THE INVENTION

Figure 1:
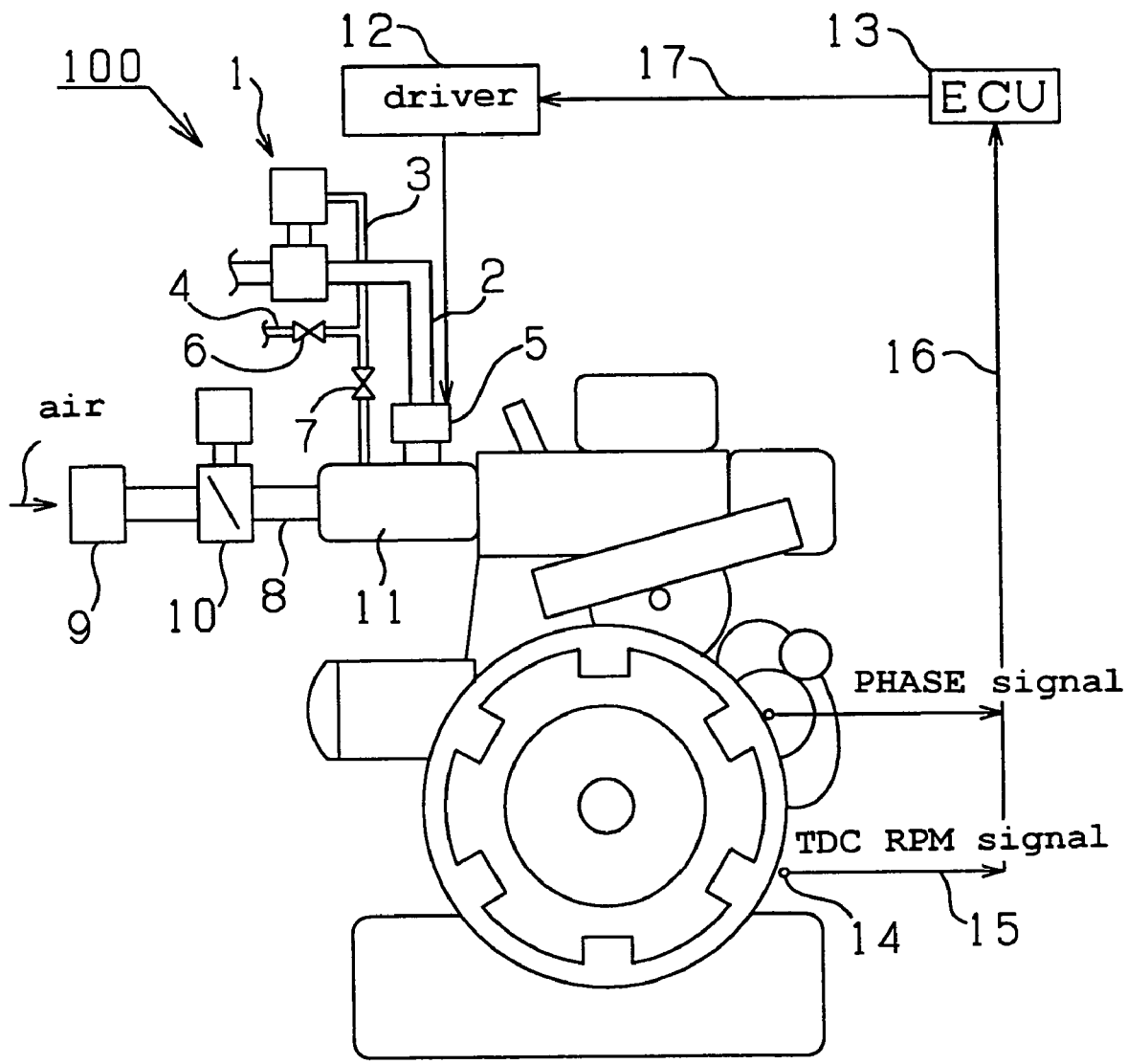
FIG. 1 is an appearance schematic view of the gas engine which is carried out according to claims 1–3.

FIG. 1 is an appearance schematic view of the gas engine 100 which is carried out according to claims 1–3.

A fuel gas feed pipe 2 equipped with a regulator 1 and a valve 5 on the way is connected to an intake port 11 communicated with a combustion chamber (not shown). Moreover, an air feed pipe 8 equipped with an air cleaner 9 and a throttle 10 is connected to the intake port 11.

The pressure of fuel gas is regulated by dozens of KPa (kilo pascal) extent from 2 KPa (kilo pascal) extent by the regulator 1. The valve 5 is driven to open and close by the driver 12, therefore, the fuel gas can be fed from a nozzle (low voltage port injection) which is not shown of the fuel gas feed pipe into the intake port 11 and the fuel gas can be also shut. Air is defecated with an air cleaner 9 and the air of the amount according to the opening of the throttle 10 is fed in the intake port 11 from the air feed pipe 8.

A gas engine 100 is put into operation with a starter which is not shown, an engine rotational frequency improves to 200 $min^{-1}$ extent, and the pneumatic pressure in the intake port at an intake or suction stroke becomes lower (to negative pressure) than the pressure of the fuel gas in the fuel gas feed pipe 2. In this time, the regulator 1 regulates the pressure of the fuel gas so that the differential pressure of both may serve as hundreds mm aq.

As shown in FIG. 1, the regulator 1 is connected to the intake port 11 via the pressure balance line 3. A branch pipe 4 equipped with a valve 6 on the way is connected to the pressure balance line 3, and a valve 7 is provided in the downstream rather than the connect portion at which the branch pipe 4 is connected to the pressure balance line 3. The pressure balance line 3 is selectively communicated with the inside of the intake port 11 or the atmospheric by opening or closing the valve 6 and the valve 7 (switching means for switching).

The pressure in the intake port 11 at the time of starting is atmospheric pressure mostly, the pressure in the intake port 11 becomes high as the engine rotational frequency rises. When the engine rotational frequency reaches to rated rotational frequency, the pressure of the intake port 11 will be settled in the pressure of the fixed range.

So, at the time of starting, the pressure balance line 3 is communicated with the intake port 11 by closing the valve 6 and opening the valve 7, and the regulator 1 adjusts the feed pressure of the fuel gas on the basis of the pressure in the intake port 11.

If the engine rotational frequency serves as for example, 200 $min^{-1}$ extent and the hundreds mm aq extent differential pressures between the fuel gas feed pipe 2 and the intake port 11 is kept at the above-mentioned pressure, the pressure balance line 3 is made to communicated with the atmospheric air by closing the valve 7 and opening the valve 6, and the feed pressure of the fuel gas is adjusted on the basis of atmospheric pressure.

As shown in FIG. 1, an engine rotational frequency detection sensor 14 (engine rotational frequency detection means) is provided in the gas engine 100. The engine rotational frequency detection sensor 14 detects a signal and transmits the detected signal to ECU 13 (judgment means) through signal lines 15 and 16.

ECU 13 includes a memory (not shown) which memorizes the tolerance of the differential pressure between the pressure of the fuel gas in the fuel gas feed pipe 2 and the pressure in the intake port 11. ECU 13 judges whether the difference between the pressure of the fuel gas in the fuel gas feed pipe 2 by the transmitted signal and the pressure in the intake port 11 is within the predetermined fixed range (tolerance range) which is memorized by the memory.

If the differential pressure is settled within the tolerance range, the gas engine 100 continues to drive. If the differential pressures is not temporarily settled within the tolerance, the ECU 13 sends a control signal to the driver 12 through a signal line 17 to carry out switching operation of the valve 5 (adjustment means).

If so large that engine rotational frequency exceeds tolerance, it will set up so that the open period of the valve 5 per 1 cycle may become short, and the amount of feed of the fuel gas to the intake port 11 will be reduced. Conversely, if so small that the engine rotational frequency does not fulfill tolerance, it will set up so that the open period of the valve 5 per 1 cycle may become long, and the amount of feed of the fuel gas to the intake port 11 will be increased.

Figure 2:
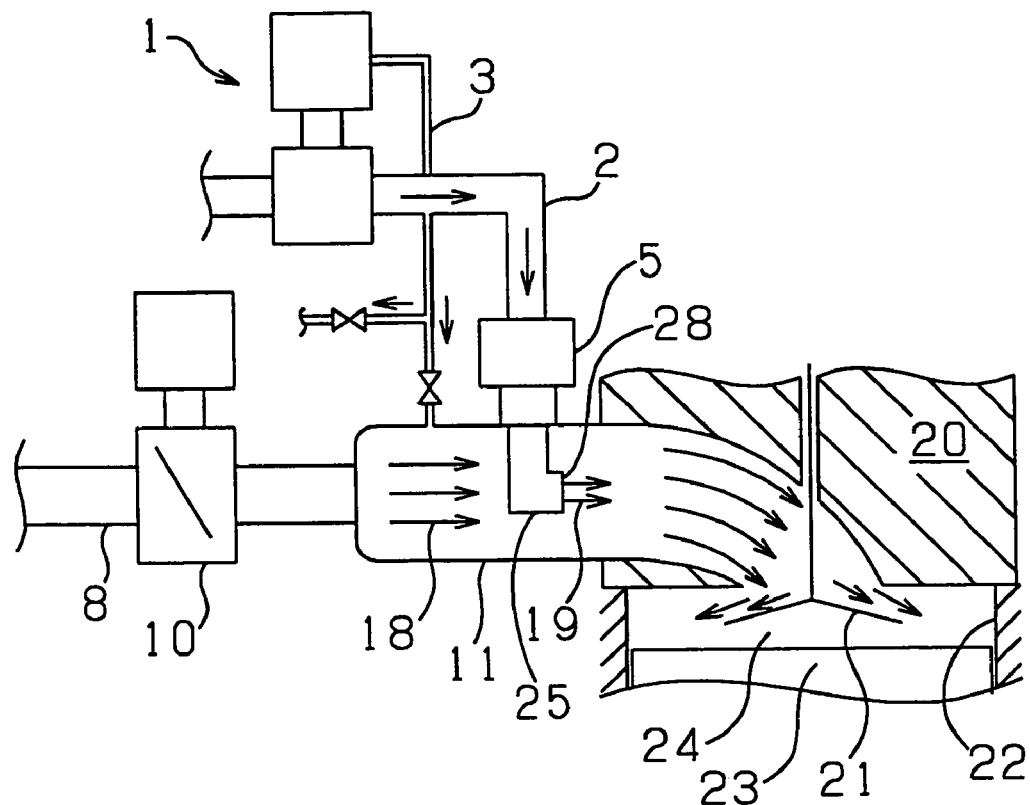
FIG. 2 is a schematic view of the system near the intake port.

FIG. 2 is a schematic view of the system near the intake port. A nozzle 25 is provided at the tip of the fuel gas feed pipe 2. Where a fuel gas feed port 28 is turned in the direction of a lower stream of a river of airstream 18, the nozzle 25 is connected with the fuel gas feed pipe 2. The nozzle 25 is installed in the condition of having projected in the intake port 11.

Since the nozzle 25 projects into the intake port 11 and the fuel gas feed port 28 (point) is provided toward the lower stream portion of the airstream 18 as shown in FIG. 2, negative pressure arises or occurs to the space near the point of the nozzle 25 by the airstream 18, and it becomes easy to feed the fuel gas 19 in the intake port 11.

A piston 23 moves in the direction to extend the volume of a combustion chamber 24 at the suction stroke, the fuel gas 19 which passed the open intake valve 21 and is mixed with airstream 18 is supplied to the combustion chamber 24 formed by the top face of a cylinder head 20, a cylinder liner 22 and a piston 23 etc.

Figure 3:
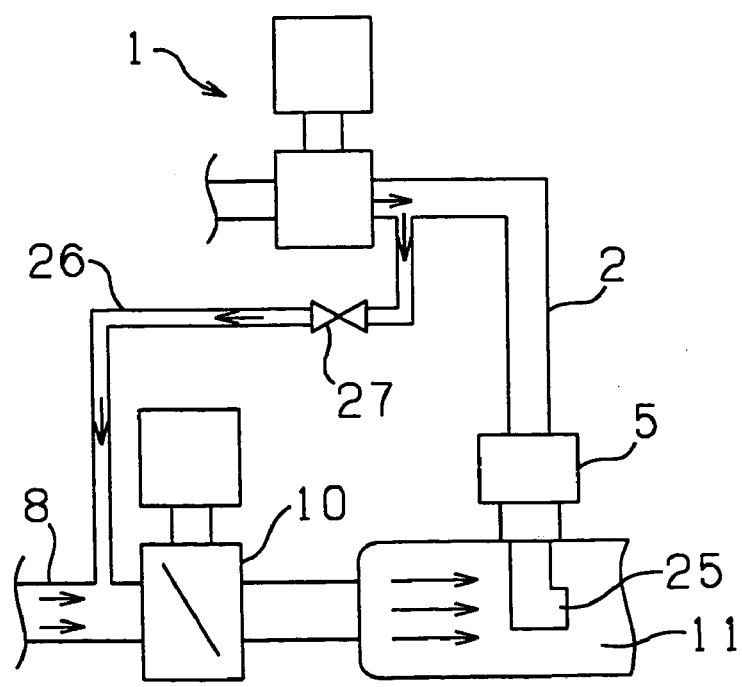
FIG. 3 is a schematic view of the system showing the feed passage of the fuel gas to the intake port at the time of another starting than FIG. 1 and FIG. 2.

FIG. 3 is a schematic view of the system showing the feed passage of the fuel gas to the intake port at the time of another starting with FIG. 1 and FIG. 2. As shown in FIG. 3, the air feed pipe 8 located in an upper stream portion than a throttle 10 is connected to the fuel gas feed pipe 2 via a bypass pipe 26. A valve 27 is provided in the way of the bypass pipe 26. At the time of starting, the fuel gas can also be supplied in the intake port 11 through the throttle 10 from the air feed pipe 8 by opening the valve 27.

Figure 4:
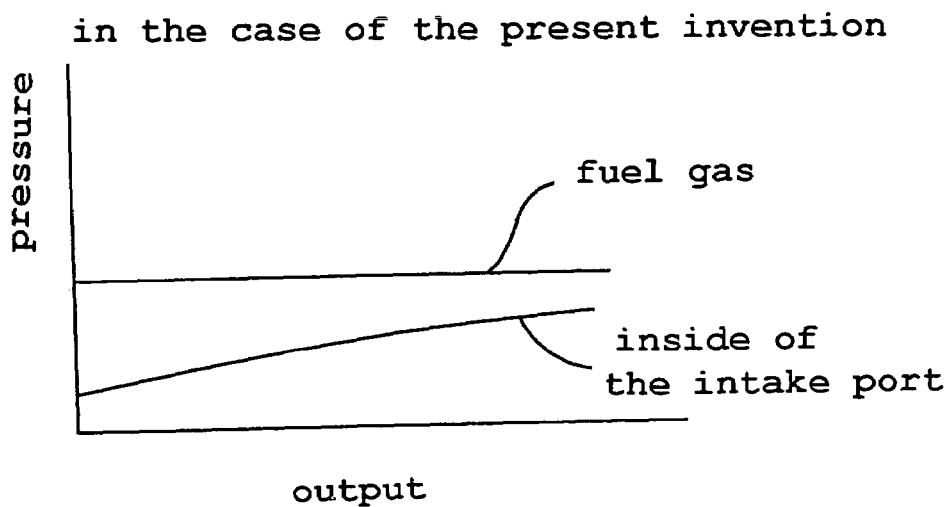
FIG. 4 is a graph which shows the relation between the pressure of the fuel gas in the fuel-feed passage and the pressure in the intake port at the time of injecting the fuel gas with high pressure in the intake port, and the output of the engine.
Figure 5:
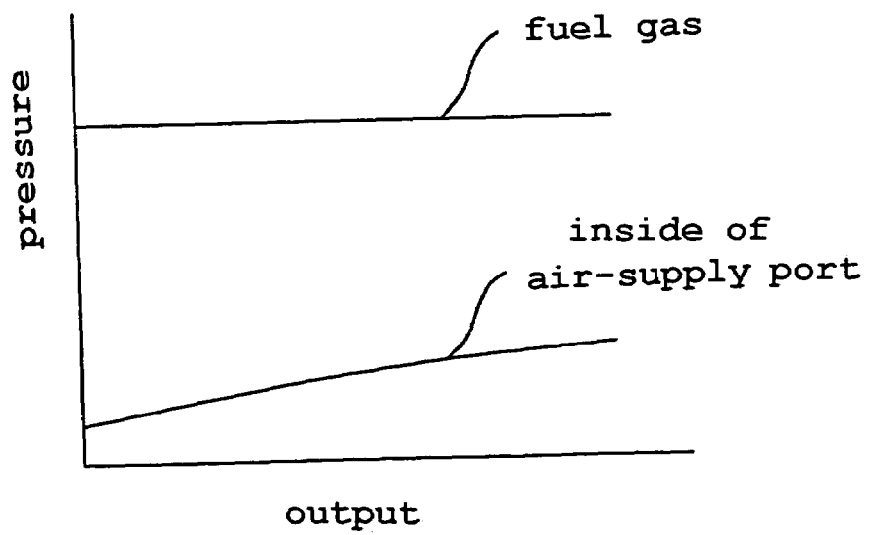
FIG. 5 is a graph shows the relation between the pressure of the fuel gas and the pressure in the air-supply port at the time of injecting the fuel gas with high pressure in the air-supply port, and the output of the supercharge type engine.

FIG. 4 is a graph which shows the relation between the pressure of the fuel gas in the fuel-feed passage and the pressure in the intake port at the time of injecting fuel gas with high pressure in the intake port, and the output of the engine. FIG. 5 is a graph shows the relation between the pressure of the fuel gas and the pressure in the intake port at the time of injecting fuel gas with high pressure in the intake port, and the output of the supercharge type engine (incidentally the gas engine 100 of this invention is a non-supercharged type). As shown in FIG. 5, when the fuel gas is supplied in the air-supply port with high pressure, even if the output improves and the differential pressure becomes small, the rate of the variation of the differential pressure is comparatively small, and hardly affects feed of the fuel gas into the intake port. However, in the present invention, as shown in FIG. 4, when the fuel gas is supplied into the intake port not by high-pressure injection but by slight differential pressure, the rate of the variation of the differential pressure which changes with improvement in an output becomes large, and it has a possibility of doing the effect which cannot be disregarded to feed of the fuel gas to the intake port.

Then, the engine rotational frequency detection sensor 14 detects the engine rotational frequency, and the open period amount of the valve 5 per 1 cycle is adjusted so that the amount of feed of the fuel gas per 1 cycle may turn into optimum dose. Consequently, it becomes possible to maintain the output uniformly easily.

Figure 6:
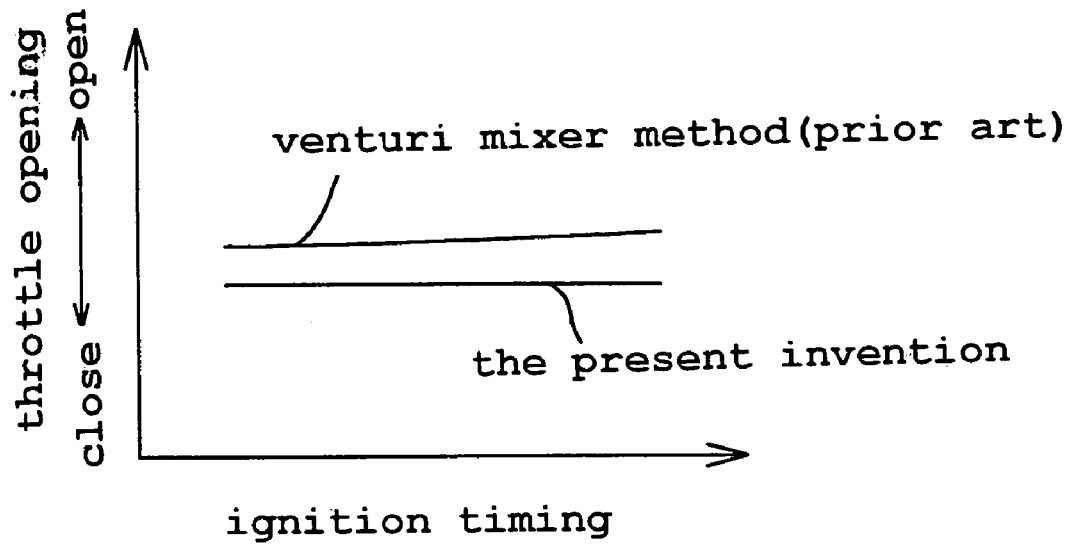
FIG. 6 is a graph which shows the relation between the throttle opening and the ignition timing in condition of the same output, both in the gas engine which is carried out according to the present invention and in the venturi mixer type gas engine.

FIG. 6 is a graph which shows the relation between the throttle opening and the ignition timing in condition of the same output, both in the gas engine which is carried out according to the present invention and in the venturi mixer type gas engine. As shown in FIG. 6, the throttle opening of the gas engine 100 which is carried out according to the present invention is always smaller without depending ignition timing rather than a throttle of a venturi mixer type gas engine.

Although it becomes high power so that the throttle opening becomes large, the throttle opening of the gas engine 100 which is carried out according to the present invention has allowances in the throttle opening rather than the throttle of a venturi mixer type gas engine.

That is, in the venturi mixer type gas engine, pressure loss occurs for a venturi throttle and improvement in the output is restricted. In contrary, in the gas engine 100 which is carried out according to the present invention, it is made as for allowances to throttle opening since such a ventrui is not provided.

Figure 7:
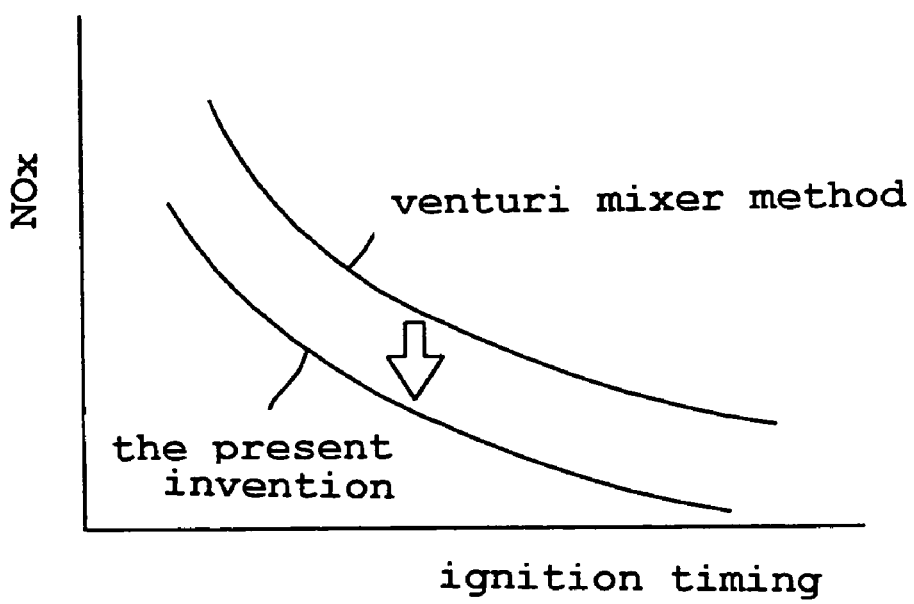
FIG. 7 is a graph which shows the relation between the amount of discharge NOx and the ignition timing in condition of the fixed rated output, both in the gas engine which is carried out according to the present invention and in the venturi mixer type gas engine.
Figure 8:
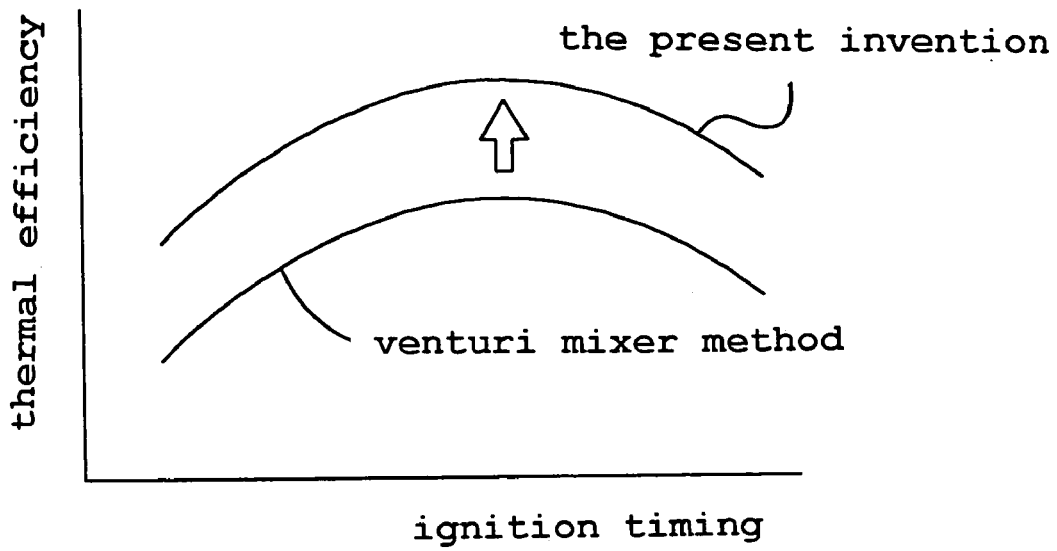
FIG. 8 is a graph which shows the relation between the thermal efficiency and the ignition timing in condition of the fixed and rated output, both in the gas engine which is carried out according to the present invention and in the venturi mixer type gas engine.
Figure 9:
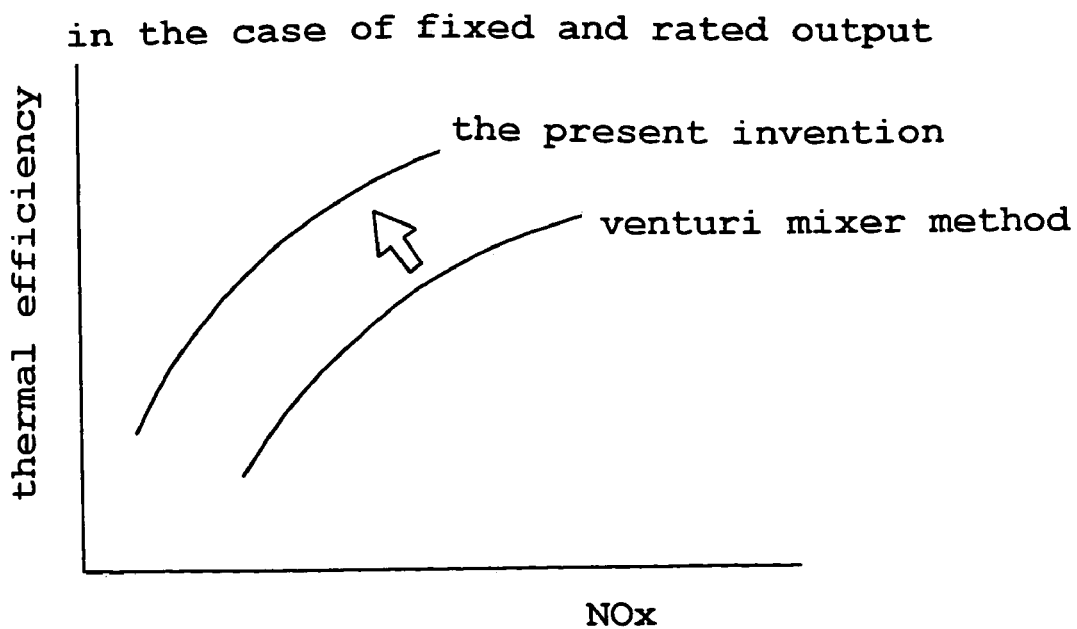
FIG. 9 is a graph which shows the relation between the thermal efficiency and amount of discharge NOx in condition of the fixed and rated output, both in the gas engine which is carried out according to the present invention and in the venturi mixer type gas engine.

FIG. 7 is a graph which shows the relation between the amount of discharge NOx and the ignition timing in condition of the fixed and rated output, both in the gas engine which carried out the present invention and in the venturi mixer type gas engine. FIG. 8 is a graph which shows the relation between the thermal efficiency and the ignition timing in condition of the fixed and rated output both in the gas engine which is carried out according to the present invention and in the venturi mixer type gas engine. Furthermore, FIG. 9 is a graph which shows the thermal efficiency in condition of the fixed and rated output of the gas engine 100 which carried out the presents invention, and the gas engine of a venturi mixer method, and the relation of the amount of discharge NOx. As shown in FIG. 7 to FIG. 9, thermal efficiency of the gas engine 100 which is carried out according to the present invention is higher (about three to four points), and the amounts of discharge NOx is smaller or fewer.

INDUSTRIAL APPLICABILITY

The present invention can be applied to a gas engine which is a non-supercharged type and supplies air and a fuel to a intake port, without mixing with a mixer.

The invention claimed is:

1. A fuel feed device of a gas engine which is a non-supercharged type engine and feeds air and a fuel to an intake port without mixing with a mixer, comprising:
   a regulator and a valve which are prepared in a fuel gas feed passage, wherein said regulator is located at an upstream side from said valve,
   a switching means for making a pressure balance line of said regulator selectively communicate with an inside of the intake port or atmospheric air,
   said pressure balance line at the time of starting communicates with the inside of the intake port by said switching means,
   wherein the fuel gas is fed into the intake port by using negative pressure generated in the intake port during an intake stroke.

2. A fuel feed device of a gas engine according to claim 1 including:
   a detection means for detecting engine rotational frequency,
   a judgment means for judging whether the engine rotational frequency detected by said detection means is maintained within a fixed range which is predetermined,
   an adjustment means for adjusting a feed period of said fuel gas per 1 cycle so that the engine rotational frequency converges within the fixed range.

* * * * *